(12) United States Patent
Calame et al.

(10) Patent No.: US 10,222,745 B2
(45) Date of Patent: Mar. 5, 2019

(54) WATCH TRANSMISSION DEVICE

(71) Applicant: ROLEX SA, Geneva (CH)

(72) Inventors: Florian Calame, Epalinges (CH);
Adrien Catheline, Valleiry (FR);
Sébastien Perseguers, Carouge (CH)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 15/456,924

(22) Filed: Mar. 13, 2017

(65) Prior Publication Data

US 2017/0269550 A1 Sep. 21, 2017

(30) Foreign Application Priority Data

Mar. 16, 2016 (EP) ..................................... 16160743

(51) Int. Cl.
| | | |
|---|---|---|
| *G04B 11/02* | (2006.01) | |
| *G04B 13/02* | (2006.01) | |
| *G04B 1/20* | (2006.01) | |
| *G04B 5/24* | (2006.01) | |

(52) U.S. Cl.
CPC ............. *G04B 13/023* (2013.01); *G04B 1/20* (2013.01); *G04B 5/24* (2013.01); *F16H 2712/10* (2013.01)

(58) Field of Classification Search
CPC .......... G04B 13/023; G04B 5/24; G04B 1/20; G04B 13/02; F16H 2712/10
See application file for complete search history.

(56) References Cited

U.S. PATENT DOCUMENTS

| | | |
|---|---|---|
| 964,180 A | 7/1910 | Peters |
| 3,019,595 A * | 2/1962 | Murrle ..................... G04B 5/24 368/148 |
| 3,472,097 A | 10/1969 | Huska |
| 6,016,289 A * | 1/2000 | Kaelin ..................... G04B 5/02 368/203 |
| 9,400,488 B2 * | 7/2016 | Marechal ................. G04B 5/12 |
| 9,429,913 B2 * | 8/2016 | Gruenig ............... G04B 11/008 |

(Continued)

FOREIGN PATENT DOCUMENTS

| | | |
|---|---|---|
| CH | 74144 A | 1/1917 |
| CH | 146603 A | 4/1931 |

(Continued)

OTHER PUBLICATIONS

Translation—FR701884—epo.org—Feb. 13, 2018.*

(Continued)

*Primary Examiner* — Sean Kayes
(74) *Attorney, Agent, or Firm* — Westerman, Hattori, Daniels & Adrian, LLP (57) ABSTRACT

Transmission device (100), for example for a watch mechanism (110), in particular for a winding train (100, 201) of a watch movement (120), including an input element (6) intended to be driven only in a first direction, an output element, a first mechanical connection arranged such that the displacement of the input element in a first direction causes the displacement of the output element in a second direction, and a second mechanical connection (9', 9) arranged such that the displacement of the input element in the first direction causes the displacement of the output element in a third direction, the third direction being opposite the second direction.

20 Claims, 8 Drawing Sheets

(56) References Cited

U.S. PATENT DOCUMENTS

2012/0044789 A1    2/2012  Nicoud
2015/0124569 A1*   5/2015  Decosterd ................ G04B 1/20
                                                           368/127

FOREIGN PATENT DOCUMENTS

| EP | 2 420 899 A1 | 2/2012 |
| FR | 701884 A | 3/1931 |
| FR | 857402 A | 9/1940 |
| FR | 2 550 839 A1 | 2/1985 |

OTHER PUBLICATIONS

European Search Report and Written Opinion dated Sep. 13, 2016 in counterpart European application No. EP16160743; w/ English partial translation and partial machine translation (14 pages).

* cited by examiner

WATCH TRANSMISSION DEVICE

This application claims priority of European patent application No. EP16160743.7 filed Mar. 16, 2016, which is hereby incorporated by reference herein in its entirety.

The invention relates to a transmission device, that is to say for the transmission of movement or energy. It also relates to a watch mechanism comprising such a device. It further relates to a watch movement comprising such a device or such a mechanism. It likewise relates to a timepiece, for example a wristwatch, comprising such a device, such a mechanism or such a movement. The invention finally relates to a method of operation of such a transmission device, of such a watch mechanism, of such a watch movement or of such a timepiece and a method of modification of a timepiece.

Watch barrels, in particular barrels for timepieces with automatic winding, are generally associated with devices for limiting the torque in order to mitigate the risks of overtightening the barrel spring. The devices for limiting the torque that are familiar from the prior art propose the conventional implementation of friction systems that are configured for the sole purpose of preventing the additional winding of the barrel spring beyond a threshold of maximum winding torque. Such friction systems may thus be placed under load very frequently, for example when the barrel spring is constantly wound by an automatic winding mechanism, and are at risk of being particularly susceptible to wear because of this.

Two families of devices for limiting the torque of a barrel are familiar from the prior art.

According to the first family of embodiments, the torque limiting device consists of a friction system which is implemented on the outside of the barrel drum. Such a system is disclosed, for example, in CH 160492, in which a friction mobile is disposed at the interface between an oscillating mass and a barrel, or in document CH146603, in which overtightening of the barrel spring is prevented by the provision of a friction spring carried directly by the support for the oscillating mass. Such constructions are difficult to integrate within the movement and are particularly susceptible to wear.

According to the second family of embodiments, a torque limiting device consists of a friction system which is implemented within the barrel drum. A solution, which is currently adopted nowadays, consists of connecting the barrel spring under friction to the internal wall of the drum by means of an elastic blade commonly referred to as a "slipping spring", which is attached at the outer extremity of the barrel spring. According to the prior art, the internal wall of the drum may include sliding surfaces and cut-outs in the form of slots, in which the slipping spring is capable of coming into abutment in such a way as to generate high driving torques for the barrel. Such a solution is satisfactory to the extent that it makes it possible to achieve such torque levels at the barrel while maintaining the integrity of the barrel spring. Like the aforementioned solutions, however, the internal wall of the barrel drum may be subject to wear. Patent application EP2420899 proposes, for example, to endeavor to address this problem by means of a particular configuration of barrel drum slots.

The aim of the invention is to make available a transmission device enabling the aforementioned disadvantages to be addressed and enabling the transmission devices that are familiar from the prior art to be improved. In particular, the invention proposes a transmission device enabling the wear due to sliding in a barrel or in a transmission train upstream of the barrel to be limited.

A transmission device according to the invention is defined by claim 1.

Different embodiments of the device are defined by dependent claims 2 to 7.

A mechanism according to the invention is defined by claim 8.

A movement according to the invention is defined by claim 9.

A timepiece according to the invention is defined by claim 10.

A method of operation according to the invention is defined by claim 11.

Different embodiments of the method are defined by dependent claims 12 to 14.

A method of modification of a timepiece according to the invention is defined by claim 15.

The accompanying figures represent, by way of example, an embodiment of a timepiece incorporating a transmission device according to the invention.

An embodiment of a timepiece 130 is described below with reference to FIGS. 1 to 11. The timepiece is a watch, for example, in particular a wristwatch, and specifically an automatic wristwatch. The timepiece comprises a watch movement 120, itself comprising a mechanism 110.

The mechanism comprises an energy source 200, for example an oscillating mass or a winding crown, a barrel 2 and a winding train 100, 201, connecting the energy source to the barrel 2. The winding train comprises a transmission device 100 and a wheel train 201 enabling a movement to be transmitted to the device only in a first direction.

The transmission device 100 comprises:
- an input element 6 intended to be driven only in the first direction,
- an output element 7,
- a first mechanical connection 61a, 71a arranged such that the displacement of the input element in the first direction causes the displacement of the output element in a second direction, and
- a second mechanical connection 9', 9, 90, 82', 62 arranged such that the displacement of the input element in the first direction causes the displacement of the output element in a third direction, the third direction being opposite the second direction.

The input element is a ratchet 6, for example. The input element is pivoted advantageously about a first axis A6. The wheel train 201 connects the input element mechanically to the energy source 200.

The output element is a first plate 7, for example. The output element is pivoted advantageously about the first axis A6 and/or is intended to be integral in rotation with an arbor 4 of the barrel 2. For example, the output element is intended to be mounted squarely on the arbor 4. A screw is provided to immobilize the output element on the arbor 4.

In the represented embodiment, the input elements and output elements are pivoted about the same axis A6, and the first and second directions are coincident.

The transmission device has the distinguishing feature of combining two advantageously complementary effects. On the one hand, this device makes it possible to avoid the overtightening of a barrel spring 3 when this reaches a level of winding approaching its threshold of maximum winding and, on the other hand, this same device makes it possible to diminish, or to diminish significantly, the level of winding of the spring and, in so doing, to distance, or even to distance significantly, the level of winding of the spring from its threshold of maximum winding. For this purpose, the device includes the first mechanical connection permitting the disengagement of the barrel spring and the second mechanical connection which allows the at least partial unwinding of the barrel spring as soon as the disengagement of the spring is effective.

Such a solution makes it possible advantageously to minimize the friction loadings and, in so doing, to minimize the risks of wear, in particular for an automatic timepiece equipped with a winding mechanism of which the speed of winding is optimized. Furthermore, such a solution makes it possible to minimize any disturbances of the torque supplied by the barrel when the barrel spring reaches its threshold of maximum winding. Even more advantageously, such a solution makes it possible to optimize the number of winding turns of the barrel spring in a given barrel volume, thanks to the fact that the device limiting the torque is disposed not only within the barrel drum, but also on the outside of the barrel.

The transmission device according to the invention is distinguished from the embodiments that are familiar from the prior art by the fact that it includes a system allowing the unwinding of the barrel spring as soon as the barrel spring is disengaged from the energy source 200 once the spring has reached a predefined threshold of maximum winding. More specifically, this device permits the counter rotation of the barrel arbor 4, that is to say the rotation of the barrel arbor in a direction counter to that permitting the winding of the barrel spring, during actuation of the winding train of the barrel, for example during actuation of the input element, thereby permitting the at least partial unwinding of the barrel spring when the latter has reached a predefined threshold of maximum winding.

In particular, the transmission device according to the invention is distinguished from the embodiments that are familiar from the prior art by the fact that, in these embodiments, no corresponding device is provided to reduce the loadings in the event of the barrel spring being fully wound, for example no corresponding device being provided to reduce the friction due to sliding and thus the wear.

In order to achieve these aims, the transmission device comprises the first mechanical connection which permits the disengagement of the input element and the output element and which is connected to the second mechanical connection allowing the at least partial unwinding of the spring 3.

Advantageously, the transmission device according to the invention may be disposed in place of a conventional ratchet of a watch barrel.

In a first configuration of the transmission device, the winding train winds the barrel spring 3 for as long as the spring 3 has not reached a predefined threshold of maximum winding. In this first configuration, the first mechanical connection does not limit the transmitted torque. The barrel arbor 4 is thus driven in the second direction of rotation such that the spring 3 is able to wind around the core of the barrel arbor. This direction of rotation coincides with the first direction of rotation of the input element when the winding train is actuated.

Once the spring 3 has reached a predefined threshold of maximum winding, or a first predefined torque threshold, the first mechanical connection makes it possible to disconnect the input element 6 from the output element and, accordingly, to disconnect the energy source 200 from the barrel arbor 4. In this second configuration of the transmission device, the rotation of the input element 6 caused by the energy source no longer causes the rotation of the barrel arbor 4 and thus no longer acts on the spring 3.

Once the arbor 4 has been disconnected from the energy source, rotation of the input element 6 caused by the energy source permits the activation of a second mechanical connection allowing the at least partial unwinding of the spring 3. In this third configuration of the transmission device, the barrel arbor 4 is driven in a third direction of rotation such that the spring 3 is able to unwind around the core of the barrel arbor. This direction of rotation is contrary to that of the direction of rotation of the input element 6 when the drive train is actuated.

Once the spring 3 has been unwound, at least partially, the transmission device 1 reverts to the first configuration, in which the winding train, under the influence of the energy source, winds the barrel spring for as long as the spring 3 has not reached the predefined torque threshold.

Preferably, the first mechanical connection comprises one or a plurality of arms 71, for example one or a plurality of arms formed on the output element, and one or a plurality of protrusions 61a, for example one or a plurality of protrusions formed on the input element, the arms and the protrusions interacting, for example, by positive engagement. In the represented embodiment, the first mechanical connection comprises two arms 71 formed on the output element 7 and two protrusions 61a formed on the input element 6, the arms and the protrusions interacting by positive engagement.

The one or more arms 71 may, for example, be integrally formed with the output element 7. The extremities 71a of the arms are advantageously provided in order to interact with the protrusions 61a formed on an internal wall 61 of the input element.

Figure 1:
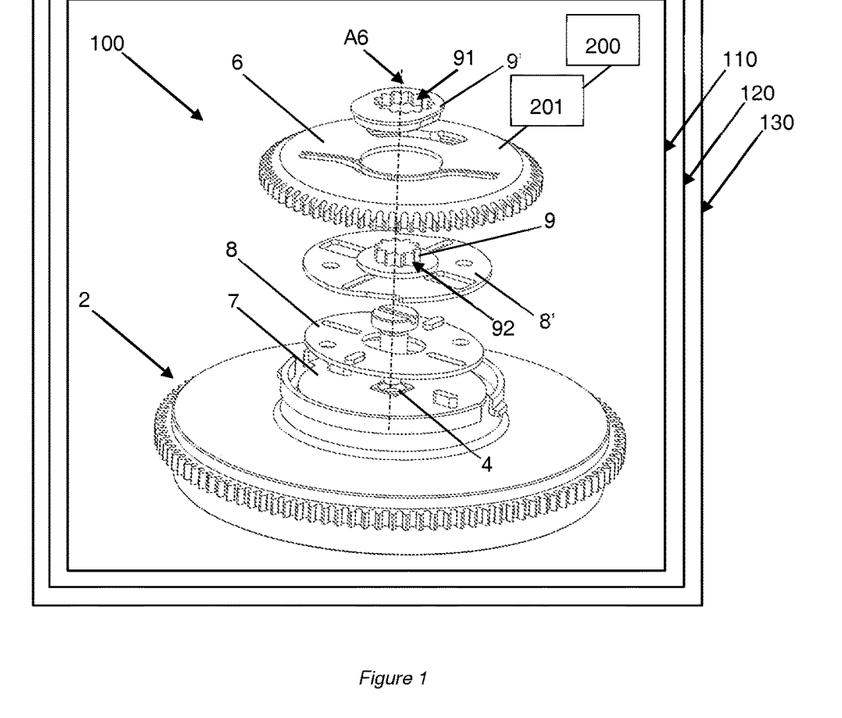
FIG. 1 is a diagram of an embodiment of a timepiece according to the invention including an embodiment of a transmission device according to the invention.
Figure 2:
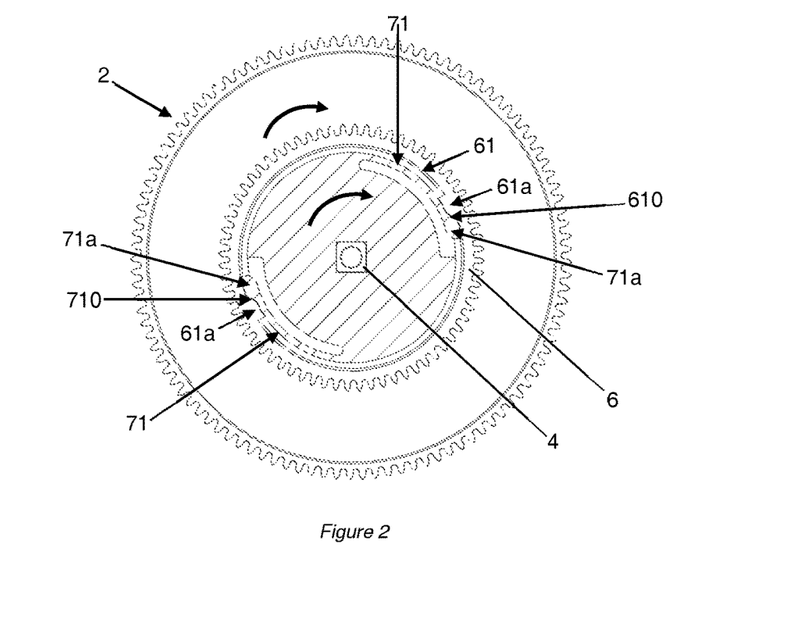
FIGS. 2 to 6 illustrate the operation of a first mechanical connection of the embodiment of the transmission device according to the invention.
Figure 3:
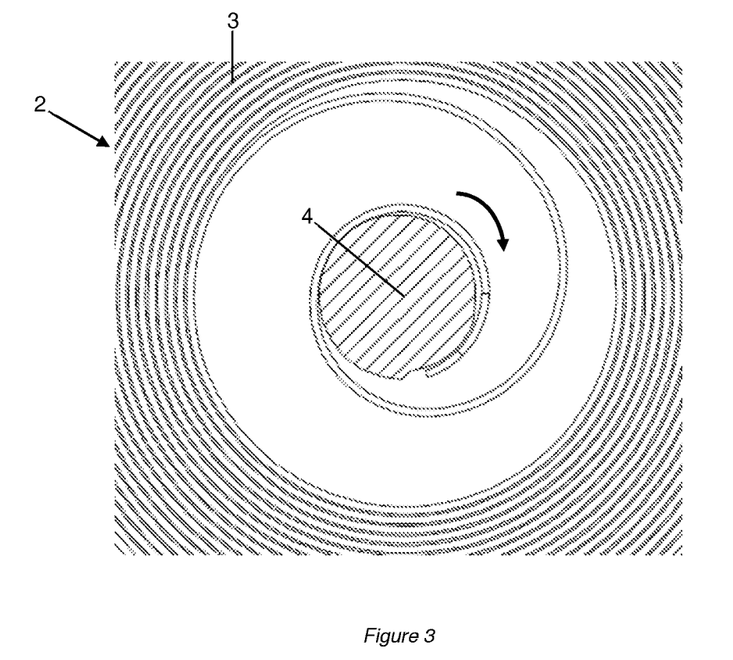

Thus, as represented in FIGS. 2 and 3, when it is set in motion, the input element 6 drives the barrel arbor 4 by means of its protrusions 61a, which guide each of the extremities 71a formed on the output element 7. Accordingly, the barrel arbor 4 is driven in a direction of rotation such that the spring 3 is able to wind around the core of the barrel arbor 4.

Advantageously, the first mechanical connection is arranged, furthermore, such that it permits the free displacement of the input element 6 relative to the output element 7 when the intensity of the mechanical torque exerted by the input element on the output element exceeds a given threshold.

For this purpose, for example,
the one or more arms are flexible, and
the one or more arms and/or the one or more protrusions have one or a plurality of slopes 610, 710, and the one or more slopes are arranged such that the one or more flexible arms flex when the intensity of the mechanical torque exerted by the input element on the output element exceeds a given threshold.

Figure 4:
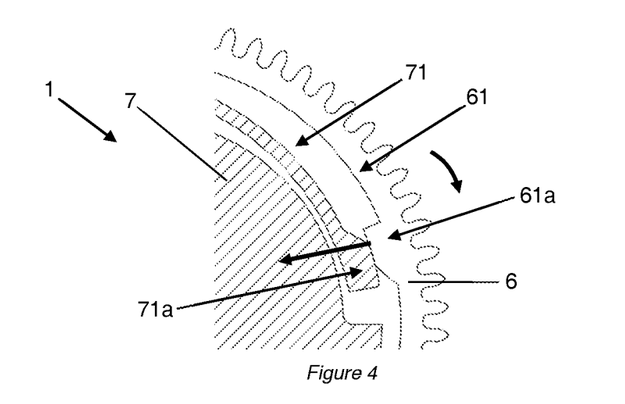
Figure 5:
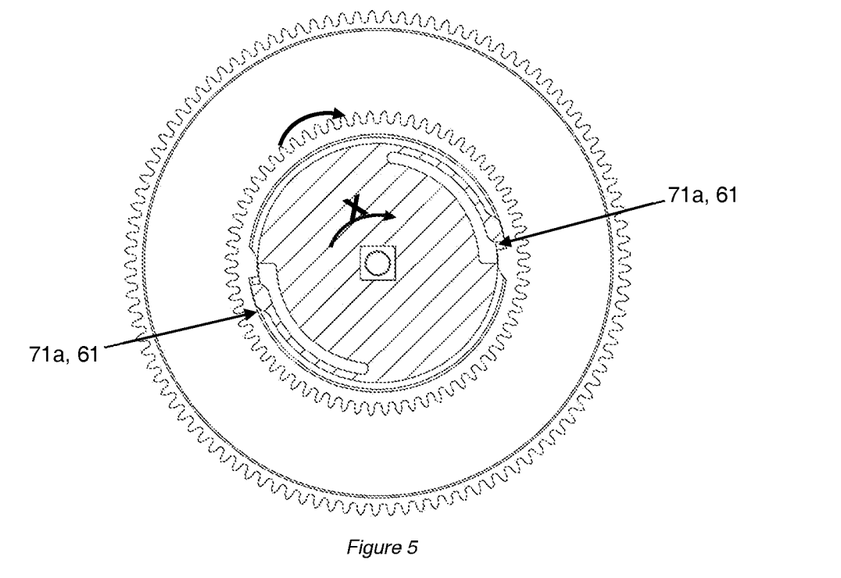

In fact, once the spring 3 has been wound sufficiently for the torque threshold to be reached, that is to say when a predefined winding threshold has been reached, the arms 71 flex during actuation of the protrusions 61a such that they are able to retract as represented in FIG. 4, and, by so doing, to permit the extremities 71a to interrupt their contact with the protrusions 61a such that the internal wall 61 of the input element 6 is able to slide against the extremities 71a of the arms 71, as represented in FIG. 5. In fact, due to the presence of the slopes 610 and/or 710, the action of the input element on the output element comprises forces which may be broken down as follows:

orthoradial forces (in relation to the axis A6) generating a torque about the axis A6, and radial forces (in relation to the axis A6) causing flexing of the arms.

A maximum threshold for the transmissible mechanical torque is determined in this way, depending on the orientation of the slopes and the rigidity of the arms.

Once the arms have flexed sufficiently, the output element 7 and, consequently, the arbor 4 are thus disconnected from the input element 6. In this second configuration of the transmission device represented in FIG. 5, the rotation of the input element caused by the winding train no longer causes the rotation of the output element 7 or that of the barrel arbor 4 and thus no longer acts on the spring 3.

As soon as the input element 6 and the output element 7 have been disconnected, the second mechanical connection permitting the partial unwinding of the spring 3 may be activated.

As represented in FIGS. 6 to 11, the second mechanical connection advantageously comprises:

a frame 9' comprising a first toothing 91, a wheel 9 comprising a second toothing 92 intended to engage with the first toothing, an Oldham coupling 90 mechanically connecting the wheel 9 and the output element 7, a cam profile 84', and a finger 62.

For example, the wheel 9 is integral in rotation with the output element 7 via the Oldham coupling. The wheel has an axis of rotation A9 that is capable of displacement in a plane perpendicular to the axis A4 of rotation of the barrel arbor 4 and relative to the axis A4 such that, in the third configuration of the transmission device, the wheel 9 is able to engage with an internal toothing of a crown formed on the frame of the movement 9' or fixed on the frame of the movement.

In the embodiment illustrated in the figures, the axis A4 of rotation of the barrel arbor 4 is coincident with the first axis A6.

Figure 7:
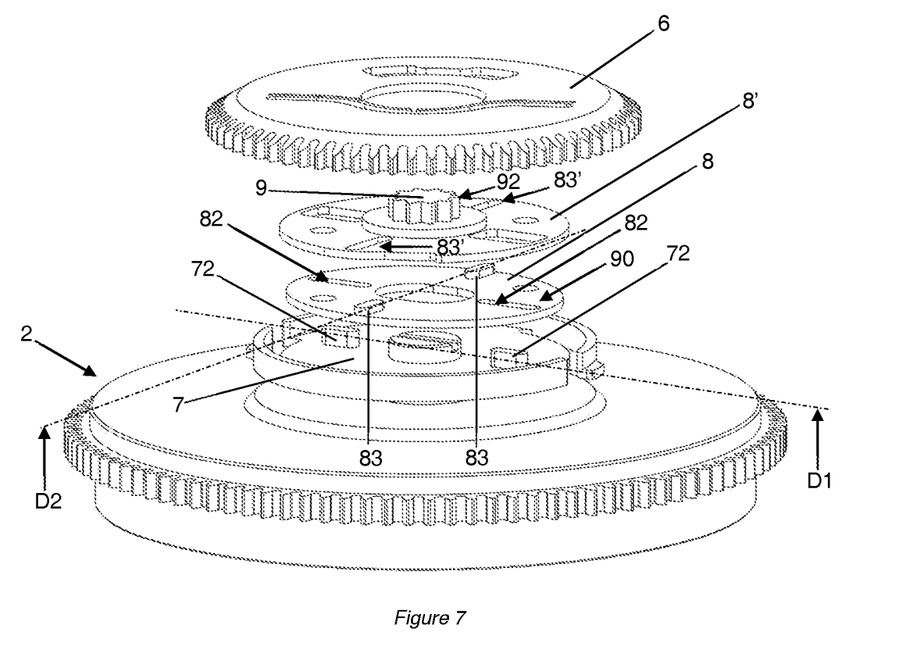
FIG. 7 is an exploded view of the embodiment of the transmission device according to the invention.

The Oldham coupling comprises the output element 7, a second plate 8 and a third plate 8', on which the wheel 9 is fixed. The first and second plates are capable of displacement in the plane perpendicular to the axis A4 relative to the output element 7. For this purpose, the second plate 8 is movably mounted in translation, according to a first direction slide D1, on the output element 7. The first slide is realized, for example, by means of oblong cutouts 82 on the second plate 8 interacting with drive pins 72 provided on the output element, the drive pins being provided, for example, so as to engage in cutouts, as represented in FIG. 7. The third plate 8' is likewise movably mounted in translation, according to a second direction slide D2, on the second plate. The second slide is realized, for example, by means of oblong cutouts 83' on the third plate 8' interacting with drive pins 83 provided on the second plate 8, the drive pins being provided, for example, so as to engage in cutouts, as represented in FIG. 7. The directions D1 and D2 are preferably orthogonal. The plate 8', and thus the wheel 9, are therefore capable of displacement in the plane perpendicular to the axis A4 relative to the output element 7 and to the arbor 4, in such a way that the wheel 9 is able to move into engagement with the frame 9'.

Figure 6:
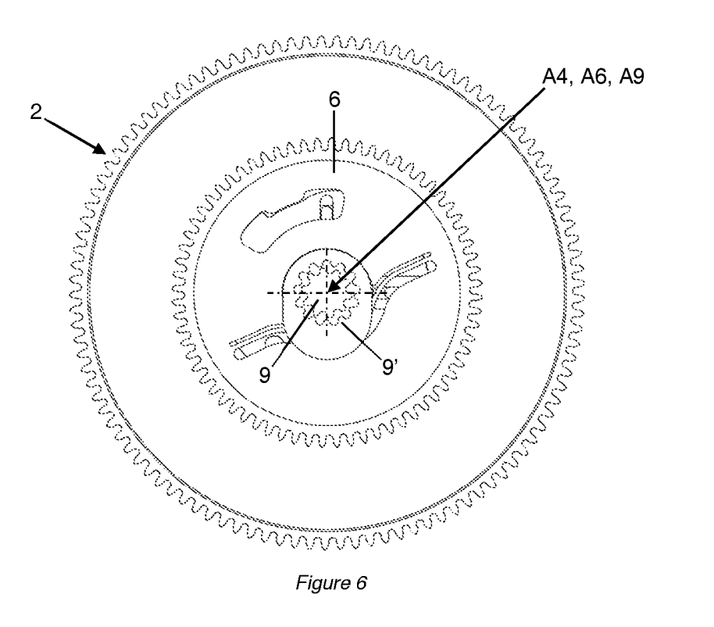

In the first and second configurations, the axis of rotation A9 of the wheel 9 coincides with the axis A4 of rotation of the barrel arbor 4, the axis A4 likewise coinciding with the axis A6 of rotation of the input element 6, as represented in FIG. 6. The wheel 9 thus pivots concentrically with the barrel arbor 4, and the second toothing 92 of the wheel 9 is beyond the reach of the first toothing 91 of the frame 9'.

The transmission device also comprises a mechanism 121 for the activation/deactivation of the second mechanical connection. This activation/deactivation mechanism makes it possible to control the eccentricity of the wheel 9 relative to the axis A4. The displacements in the plane of the plate 8' are brought about by the actuating finger 62 that is part of the activation/deactivation mechanism 121. This finger is integrally formed, for example, with the input element 6.

Figure 8:
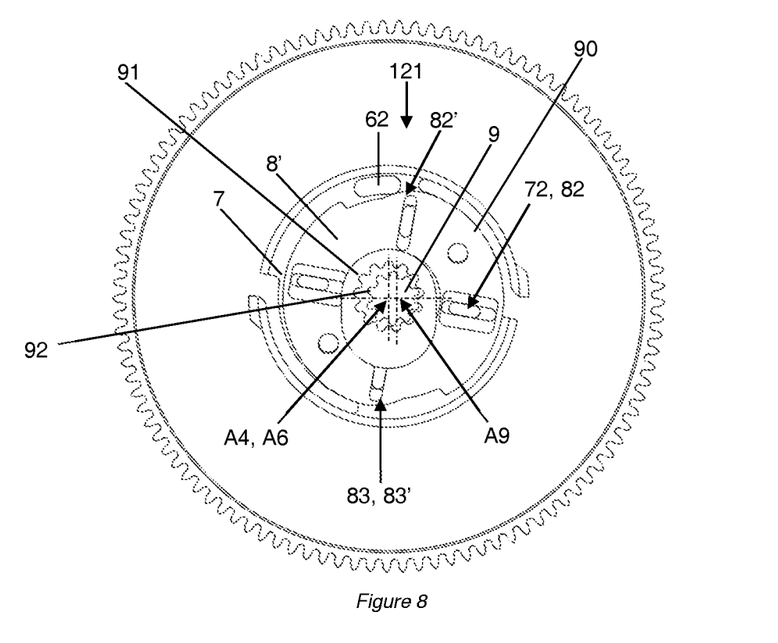
FIGS. 8 to 11 illustrate the operation of a second mechanical connection of the embodiment of the transmission device according to the invention.

FIG. 8 illustrates the transmission device in a transitory phase. This transitory phase may coincide with the second configuration described previously. It should be noted that the finger 62 is provided so as to interact with at least one cam surface 84' of the plate 8' in such a way as to cause the axis of rotation A9 of the wheel 9 to be displaced relative to the axes of rotation A4, A6 of the arbor 4 and of the input element 6, and thereby to permit the engagement of the wheel 9 with the frame 9'. For this purpose, the cam surface 84' is eccentric relative to the axes A4, A6. Preferably, the cam surface 84' is realized by an external edge of the third plate 8'.

The respective teeth 92, 91 of the wheel 9 and of the frame 9' in this case are configured in order to permit the adequate engagement of the wheel 9 and of the frame 9', independently of the angular position of the toothing 92 of the wheel 9 relative to the toothing 91 of the frame 9' during the disengagement of the action of the mechanism 121, that is to say during the displacement of the plates 8, 8' and of the wheel 9 relative to the frame 9'.

Figure 9:
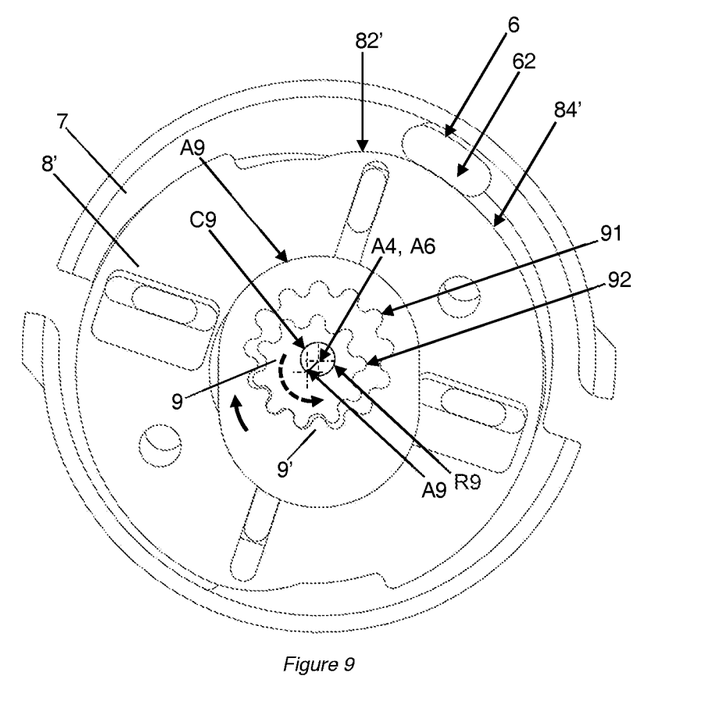

Once the respective toothings of the wheel 9 and of the frame 9' have become engaged, they are maintained in engagement as a result of the interaction of the finger of the input element 6 and the cam surface 84' defining an external circumference of the plate 8'. The finger 62 and the cam surface 84' are configured and arranged in order to define the position of the axis A9 of the wheel 9 on one and the same circle C9 of the radius R9 centered on the coinciding axes A4 and A6, as represented in FIG. 9. The wheel 9 is thus able to describe a hypocycloidal trajectory relative to the frame 9' as a result of the rotation of the input element 6.

Figure 10:
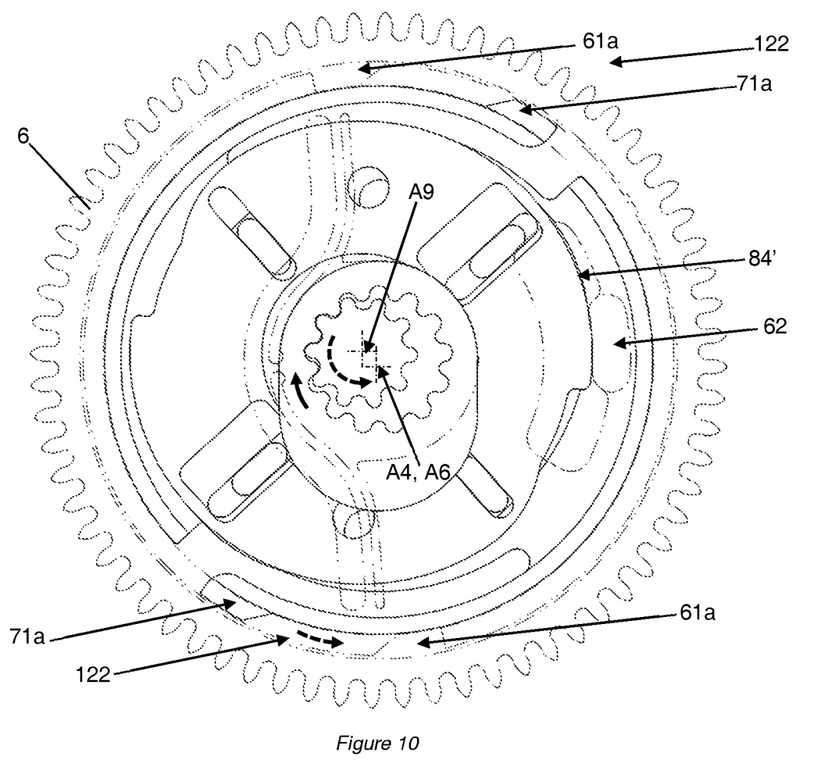

In this third configuration, the barrel arbor 4 is maintained in an angular position determined by the blocking of the toothing 92 of the wheel 9 within the toothing 91 of the frame 9'. These toothings may be substituted for a ratchet of the kind that is necessarily used in a conventional barrel system. Rotation of the input element 6 and the finger 62, under the influence of the winding train, for its part causes the displacement of the wheel 9 as a result of the eccentric displacement of the plate 8' relative to the axes A4, A6, for example the displacement of the axis A9 of the wheel 9 along the circumference of the circle C9. During the displacement of the wheel 9, the interaction by engagement of the first and second toothings 91 and 92 of the wheel 9 and of the frame 9' causes a counter rotation of the arbor 4, that is to say a rotation of the barrel arbor 4 in a direction counter to that of the input element 6. This results in the unwinding of the spring 3, as represented in FIG. 10.

Figure 11:
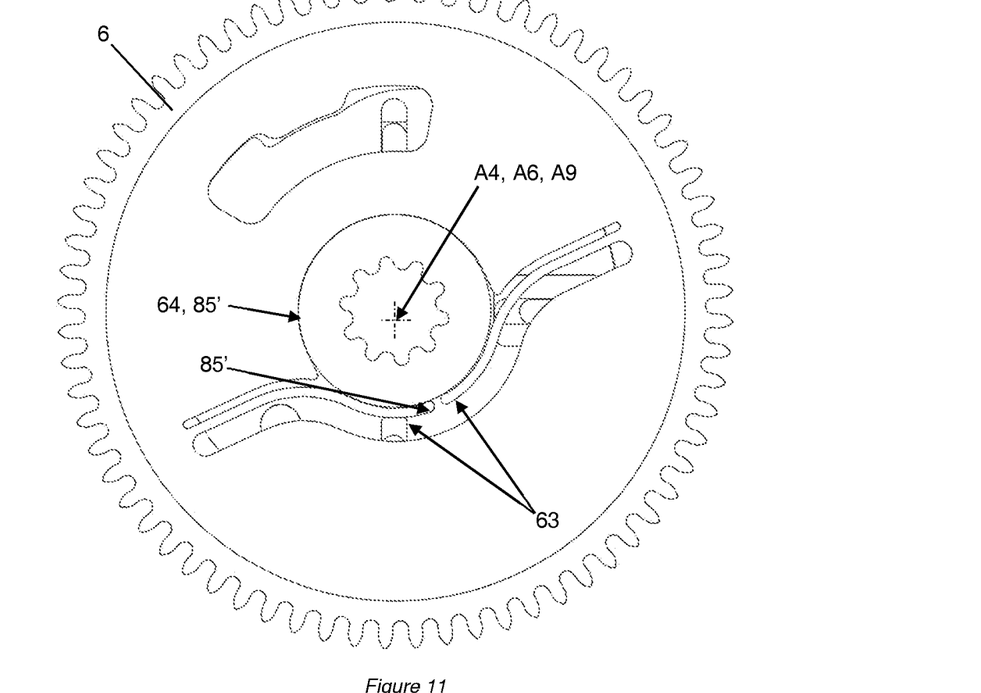

The plate 8', in particular the cam surface 84' forming the periphery of the plate 8', is returned against the finger 62 by a spring 63, as represented in FIG. 11. This spring is realized, for example, by two flexible blades 63 acting through contact on a cylindrical revolution seat 85' and coaxial with the wheel 9, as represented in FIG. 11. The spring 63 thus returns the wheel 9 into the position of rest, the position of rest being a position in which the first and second toothings are not engaged.

The speed of unwinding of the spring 3 is controlled in this case by the number of toothings of the first and second toothings 91 and 92 of the wheel 9 and of the frame 9'.

Advantageously, the second mechanical connection is arranged in such a way that it permits a free displacement of the output element relative to the input element when the input element has performed a displacement of determined amplitude relative to the frame 9'. In the represented embodiment, the second mechanical connection is arranged in such a way that it permits a free displacement of the output element relative to the input element when the input element has performed a displacement of approximately half a turn relative to the frame 9'.

The unwinding of the spring 3 may likewise be stopped by means of the mechanism 121. The counter rotation of the arbor 4 may be stopped, for example, as soon as the finger 62 of the input element is positioned facing towards a hollow 82' provided on the cam surface 84' of the plate 8'. The angular amplitude of the counter rotation of the arbor 4 is thus given by the extent of an angular portion of the cam surface 84' defining an external circumference of the plate 8'. In the represented embodiment, this angular extent is in the order of 150°, and as such permits a counter rotation of the barrel arbor 4 in the order of 150°. It is, of course, possible to increase this value to approximately 200°, or 300°, or 350°, for example when the plate 8' is provided with a single and unique hollow on the cam surface, and when the input element 6 and the output element 7 are provided respectively with a single and unique protrusion 61a and a single and unique extremity 71a of the arm. The latter displacement could also be approximately one third of a turn. In this latter instance, the first connection would comprise preferably three arms 71 interacting with three protrusions 61a.

The mechanism 121 comprises, apart from the finger 62, the cam surface 84', the spring 63, a centering surface provided on the input element and a centering surface 85' for the plate 8'. The whole is arranged in such a way that the surface 85' may be maintained against the centering surface 64 in such a way as to reposition the wheel 9 coaxially with the input element 6 when the spring is sufficiently unwound. Once the surface 85' has been recentered against the surface 64, the first and second toothings are out of reach. As soon as the extremities 71a of the output element 7 are in abutment against the protrusions 61 of the input element 6, the transmission device is thus once more in the first configuration, as illustrated by FIG. 2. Advantageously, the extremities 71a of the output element 7 may be in abutment against protrusions 61 of the inlet element 6 as soon as the finger 62 of the input element is positioned facing towards a hollow 82' in the cam surface 84' of the plate 8'.

In the represented embodiment, the second connection may be activated as soon as the first connection is no longer active. More specifically, the second connection may be activated when the first connection is no longer active. The second and third configurations of the transmission device may thus coincide. The first connection is preferably reactivated after the second connection has been deactivated.

In the whole of this document, a mechanical connection between two elements is said to be active when it connects these two elements in such a way as to drive them, for example in rotation.

Figure 13:
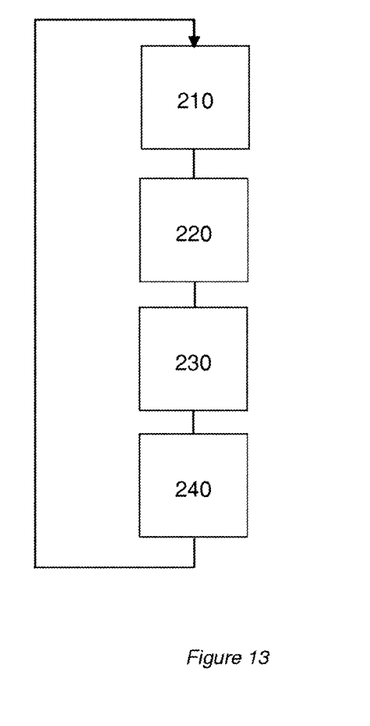
FIG. 13 is a flow chart representing an embodiment of a method of operation of a timepiece according to the invention.

A mode of implementation of a method of operation of a transmission device or of a watch mechanism or of a watch movement or of a timepiece according to the invention is described below with reference to FIG. 13. The method comprises at least one iteration of the following steps:
 a first step 210, which consists of causing the interaction, for example by connecting together, of the input and output elements 6, 7 via a first mechanical connection 61a, 71a, such that the displacement of the input element in a first direction causes the displacement of the output element in a second direction,
 a second step 220, which consists of disengaging the input and output elements,
 a third step 230, which consists of causing the interaction, for example by connecting together, of the input and output elements via a second mechanical connection 9', 9, 90, 82', 62, such that the displacement of the input element in the first direction causes the displacement of the output element in a third direction, the third direction being opposite the second direction,
 a fourth step 240, which consists of disengaging the input and output elements.

Advantageously, steps 210 to 240 are implemented in the order indicated below.

Advantageously, step 210 (and the following steps 220 to 240) are repeated after step 240.

The first disengagement is realized when the intensity of a mechanical torque exerted by the input element on the output element exceeds a given threshold. This first disengagement is a deactivation of the first mechanical connection. Advantageously, the interaction of the input and output elements 6, 7 according to the first mechanical connection consists of joining the elements together, or of connecting the elements in such a way that any displacement of one involves the same displacement of the other.

The second disengagement is realized when the input element has executed a displacement of determined amplitude relative to a frame once the input and output elements have been connected via the second mechanical connection, for example by half a turn of the input element. This second disengagement is a deactivation of the second mechanical connection. Advantageously, the interaction of the input and output elements 6, 7 according to the second mechanical connection consists of connecting the elements in such a way that any first displacement of one involves a second displacement of the other, the first and second displacements being different.

Preferably, as seen previously, the first and the second mechanical connections are activated in a mutually exclusive fashion. In other words, when the first mechanical connection is effective, the second mechanical connection is ineffective, and vice versa.

A mode of implementation of a method of modification of a timepiece or a method of repair of a timepiece is described below.

The method comprises a step involving the removal of a barrel ratchet and a step involving the fitting of a transmission device as described previously in place of the barrel ratchet. Advantageously, the method comprises a step of integrating a device 9' comprising the first toothing 91 with a frame of the movement of the timepiece.

Such a transmission device makes it possible to achieve a limitation of the torque applied to the barrel. The limitation of the torque makes it possible to reduce the loadings on the elements of the first mechanical connection by means of the second mechanical connection, the partial unwinding of the spring 3 enabling a level of torque remote from or substantially remote from the threshold of maximum winding of the barrel to be re-established, while fully meeting the good chronometric performance of the timepiece. Such a device consequently makes it possible to reduce considerably the variations in torque supplied by the barrel when the barrel spring has reached a threshold of maximum winding, and thus to minimize the variations in torque to the oscillator with respect to the known solutions from the prior art.

Figure 12:
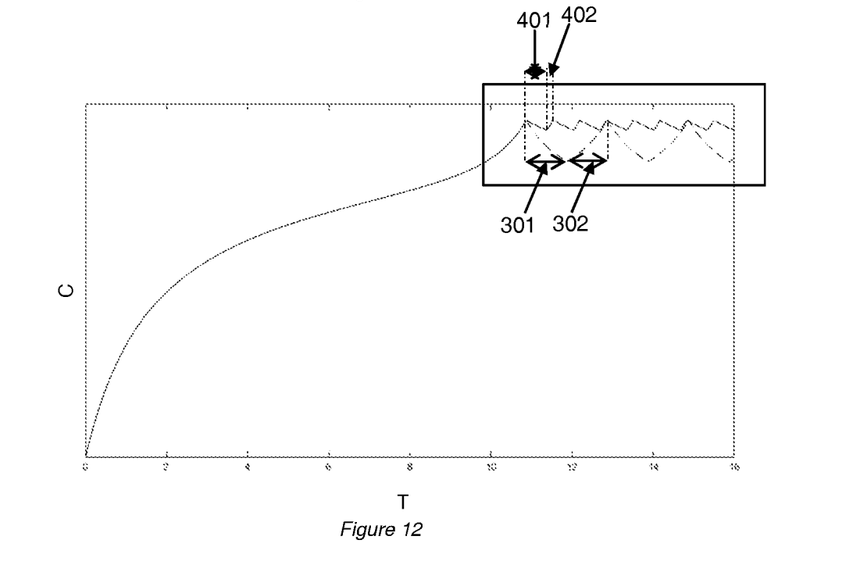
FIG. 12 is a graph representing the development of the mechanical torque (C) available at the barrel as a function of the number of turns (T) of a ratchet or input element.

FIG. 12 illustrates two winding curves for two distinct transmission devices. The number z9', z9 of the first and second respective toothings of the frame 9' and of the wheel 9 makes it possible to adjust the angular range travelled by the counter rotation of the arbor 4 depending on the angular range travelled by the input element 6 once the device 1 is in its third configuration. The curves represent the torque C depending on the displacement T of the input element.

In a first specific case illustrated by the curve shown as a solid line, the ratio z9/z9' is lower than two. Once the spring has reached the threshold of maximum winding, it will be noted that the angular range travelled by the counter rotation of the arbor 4 is lower than the angular range travelled by the input element 6. This is exemplified by the fact that, in the phase 401 of unwinding the spring, the absolute value of the slope of an affine function similar to the "unwinding" curve is lower than that of an affine function similar to the "winding" curve when the device is once more in its first configuration in a phase of winding 402.

In a second specific case illustrated by the curve shown as a dashed line, the ratio z9/z9' is equal to two. Once the spring has reached the threshold of maximum winding, it will be noted that the angular range travelled by the counter rotation of the arbor 4 is equal to the angular range travelled by the input element 6. This is exemplified by the fact that, in the phase 301 of unwinding the spring, the absolute value of the slope of an affine function similar to the "unwinding" curve is equal to that of the affine function corresponding to the "winding" curve when the device is once more in its first configuration in a phase of winding 302. In other words, in the second specific case, the unwinding and winding curves are symmetrical.

In a third specific case, not represented here, the ratio z9/z9' may also be greater than two. In this specific case, the angular range travelled by the counter rotation of the arbor 4 is greater than the angular range travelled by the input element 6. Advantageously, such a configuration makes it possible in particular to reduce the number of loadings of the elements of the first mechanical connection.

Another advantage of the device according to the invention derives from the fact that the elements permitting the limitation of the torque are not integrated within the barrel, and it is thus possible to optimize the geometry of the barrel drum in such a way as to permit the additional winding of the barrel spring and thereby to permit a gain in the autonomy of the timepiece equipped with such a barrel.

In the represented embodiment, the transmission device is disposed in place of a conventional ratchet of a barrel. It is, of course, possible to dispose this device differently within the winding train, whether manual or automatic, of the barrel and/or to cause it to interact with a conventional ratchet.

Such a transmission device is provided in order to interact both with a barrel of a going train of a watch movement and with a barrel integrated within a watch movement, for example a striking mechanism, in particular an alarm mechanism.

The invention claimed is:

1. A winding mechanism for a watch movement, comprising a barrel and a winding train, the winding train comprising a transmission device, the mechanism comprising a source of energy, the transmission device, comprising:
    an input element intended to be driven only in a first direction,
    an output element,
    a first mechanical connection arranged so that the displacement of the input element in the first direction causes the displacement of the output element in a second direction, and
    a second mechanical connection arranged so that the displacement of the input element in the first direction causes the displacement of the output element in a third direction, the third direction being opposite the second direction.

2. The winding mechanism according to claim 1, wherein at least one of (i) the input element is a ratchet, (ii) the output element is a plate, and (iii) the input element is designed to be integral in rotation with a barrel arbor.

3. The winding mechanism according to claim 1, wherein at least one of (i) the first mechanical connection is arranged so that the first mechanical connection permits the free displacement of the input element relative to the output element when the intensity of a mechanical torque exerted by the input element on the output element exceeds a given threshold, and (ii) the first mechanical connection comprises one or a plurality of arms, and one or a plurality of protrusions, the arms and the protrusions interacting by positive engagement.

4. The winding mechanism according to claim 3, wherein:
    the one or more arms are flexible, and
    at least one of (i) the one or more arms and (ii) the one or more protrusions have one or a plurality of slopes, and
    the one or more slopes are arranged so that the one or more flexible arms flex when the intensity of the mechanical torque exerted by the input element on the output element exceeds a given threshold.

5. The winding mechanism according to claim 1, wherein the second mechanical connection is arranged so that the second mechanical connection permits the free displacement of the output element relative to the input element when the input element has performed a displacement of determined amplitude relative to a frame.

6. The winding mechanism according to claim 1, wherein the second mechanical connection comprises:
    a frame comprising a first toothing,
    a wheel comprising a second toothing intended to engage with the first toothing,
    an Oldham coupling mechanically connecting the wheel and the output element,
    a cam profile, and
    a finger.

7. The The winding mechanism according to claim 1, wherein at least one of (i) the device comprises a return spring in the position of rest of the wheel, the position of rest being a position in which the first and second toothings are not engaged, and (ii) the first direction and the second direction are coincident.

8. A watch movement comprising a winding mechanism according to claim 1.

9. A timepiece comprising a winding mechanism according to claim 1.

10. A method of operation of a transmission winding mechanism according to claim 1, comprising at least one iteration of the following:
   interaction of the input and output elements via the first mechanical connection, so that the displacement of the input element in the first direction causes the displacement of the output element in the second direction,
   first disengagement of the input and output elements,
   interaction of the input and output elements via the second mechanical connection, so that the displacement of the input element in the first direction causes the displacement of the output element in the third direction, the third direction being opposite the second direction,
   second disengagement of the input and output elements.

11. A method of operation according to claim 10, wherein the first disengagement is realized when the intensity of a mechanical torque exerted by the input element on the output element exceeds a given threshold.

12. The method of operation according to claim 10, wherein the second disengagement is realized when the input element has executed a displacement of determined amplitude relative to a frame in the course of the interaction of the input and output elements via the second mechanical connection.

13. The method of operation according to claim 10, wherein the first and the second mechanical connections are activated in a mutually exclusive fashion.

14. A method of modification of a timepiece or method of repair of a timepiece, comprising removing a barrel ratchet and fitting a transmission device according to claim 1 in place of the removed barrel ratchet.

15. The winding mechanism according to claim 1, wherein the input element is a ratchet pivoted about a first axis.

16. The winding mechanism according to claim 1, wherein the output element is a plate, pivoted about a first axis.

17. The winding mechanism according to claim 1, wherein the input element is designed to be integral in rotation with a barrel arbor.

18. The winding mechanism according to claim 1, wherein the first mechanical connection is arranged so that the first mechanical connection permits the free displacement of the input element relative to the output element when the intensity of a mechanical torque exerted by the input element on the output element exceeds a given threshold.

19. The winding mechanism according to claim 1, wherein the first mechanical connection comprises one or a plurality of arms formed on the output element, and one or a plurality of protrusions formed on the input element, the arms and the protrusions interacting by positive engagement.

20. A transmission device for a winding train of a watch movement, comprising:
   an input element intended to be driven only in a first direction,
   an output element,
   a first mechanical connection arranged so that the displacement of the input element in the first direction causes the displacement of the output element in a second direction, and
   a second mechanical connection arranged so that the displacement of the input element in the first direction causes the displacement of the output element in a third direction, the third direction being opposite the second direction,
   wherein the second mechanical connection comprises:
   a frame comprising a first toothing,
   a wheel comprising a second toothing intended to engage with the first toothing,
   an Oldham coupling mechanically connecting the wheel and the output element,
   a cam profile, and
   a finger.

* * * * *